(12) United States Patent
Harding

(10) Patent No.: US 10,968,754 B2
(45) Date of Patent: Apr. 6, 2021

(54) AEROFOIL

(71) Applicant: ROLLS-ROYCE plc, London (GB)

(72) Inventor: Adrian L. Harding, Derby (GB)

(73) Assignee: Rolls-Royce plc

( * ) Notice: Subject to any disclaimer, the term of this patent is extended or adjusted under 35 U.S.C. 154(b) by 51 days.

(21) Appl. No.: 16/191,663

(22) Filed: Nov. 15, 2018

(65) Prior Publication Data

US 2019/0186274 A1    Jun. 20, 2019

(30) Foreign Application Priority Data

Dec. 14, 2017   (GB) .................................... 1720828

(51) Int. Cl.
| | | |
|---|---|---|
| *F01D 5/18* | (2006.01) | |
| *B23P 15/04* | (2006.01) | |
| *F01D 5/14* | (2006.01) | |

(52) U.S. Cl.
CPC .............. *F01D 5/187* (2013.01); *B23P 15/04* (2013.01); *F01D 5/147* (2013.01);
(Continued)

(58) Field of Classification Search
CPC . F01D 5/187; F01D 5/147; F01D 5/18; F05D 2230/21; F05D 2230/211;
(Continued)

(56) References Cited

U.S. PATENT DOCUMENTS 2,873,944 A * 2/1959 Wiese ..................... F01D 5/189
416/92

3,806,276 A * 4/1974 Aspinwall ............... F01D 5/189
416/97 R (Continued)

FOREIGN PATENT DOCUMENTS

| CN | 103046967 A | 4/2013 |
| EP | 0090887 | 10/1983 |

(Continued)

OTHER PUBLICATIONS

Nickel-alloys.net, "Everything You Wanted to Know About Nickel Alloys", (Sep. 2017 for Super nickel section, Jul. 2006 for copper nickel), pp. 1-6 and 1-3 (Year: 2017).*

(Continued)

*Primary Examiner* — David Hamaoui
*Assistant Examiner* — Joshua R Beebe
(74) *Attorney, Agent, or Firm* — Barnes & Thornburg LLP

(57) ABSTRACT

Aerofoil including: a body comprising first body portion and second body portion bonded to first body portion, first and second body portions having outer faces forming an outer surface of the aerofoil, and inner faces opposing the outer faces; a channel formed within the aerofoil by the inner faces of the first body portion and the second body portion; and a dividing sheet provided within the channel, such that a cooling passage is formed between the dividing sheet and the inner face of at least one of the first body portion and second body portion, cooling passage arranged to conduct cooling fluid adjacent the body, for cooling the body; wherein the body has a rear face and an opposing front face; and the dividing sheet extends parallel to at least a portion of a rear face of the body, such that the cooling passage formed parallel to the rear face.

17 Claims, 4 Drawing Sheets

(52) U.S. Cl.
CPC .... *F05D 2230/21* (2013.01); *F05D 2230/211* (2013.01); *F05D 2230/237* (2013.01); *F05D 2240/301* (2013.01); *F05D 2260/20* (2013.01); *F05D 2260/204* (2013.01)

(58) Field of Classification Search
CPC ......... F05D 2230/237; F05D 2240/301; F05D 2260/20; F05D 2260/204; F05D 2230/232; B23P 15/04
See application file for complete search history.

(56) References Cited

U.S. PATENT DOCUMENTS

| | | | | |
|---|---|---|---|---|
| 4,089,456 | A | * | 5/1978 | Toppen .................. B23K 20/00 228/195 |
| 4,606,778 | A | * | 8/1986 | Jahnke .................. B23K 20/16 148/527 |
| 4,611,752 | A | * | 9/1986 | Jahnke .................. B23K 20/16 228/194 |
| 5,152,059 | A | | 10/1992 | Midgley |
| 5,246,340 | A | | 9/1993 | Winstanley et al. |
| 5,259,730 | A | * | 11/1993 | Damlis .................. B23P 15/04 416/96 A |
| 5,419,039 | A | | 5/1995 | Auxiet et al. |
| 8,449,249 | B2 | * | 5/2013 | Suchezky ............... F01D 5/147 415/139 |
| 8,562,295 | B1 | | 10/2013 | Liang |
| 9,488,066 | B2 | * | 11/2016 | Yamashita ................ F01D 5/16 |
| 2011/0135497 | A1 | | 6/2011 | Marmilic et al. |
| 2011/0297344 | A1 | * | 12/2011 | Campbell ................ B22C 9/10 164/98 |
| 2015/0159488 | A1 | | 6/2015 | Lehmann et al. |
| 2016/0215627 | A1 | * | 7/2016 | Roberge ................. B32B 37/12 |
| 2016/0222806 | A1 | * | 8/2016 | Jennings ................ F01D 9/041 |

FOREIGN PATENT DOCUMENTS

| | | |
|---|---|---|
| EP | 0520714 | 12/1992 |
| EP | 1216785 | 6/2002 |
| EP | 1760264 A2 | 3/2007 |
| GB | 2518335 | 3/2015 |
| JP | 2000248901 A | 9/2000 |
| WO | 2015058043 | 4/2015 |

OTHER PUBLICATIONS

Extended European Search Report, European Application No. 18206187.9-1006, dated Apr. 18, 2019, 24 pages.

Great Britain Search Report dated Jun. 8, 2018, issued in GB Patent Application No. 1720828.1.

Great Britain Search Report dated Jun. 12, 2018, issued in GB Patent Application No. 1720829.9.

European Office Action, dated Apr. 29, 2020 in connection with European Application No. 18206187.9-1004, 9 pages.

* cited by examiner

AEROFOIL

CROSS-REFERENCE TO RELATED APPLICATIONS

This specification is based upon and claims the benefit of priority from UK Patent Application Number GB 1720828.1 filed on Dec. 14, 2017, the entire contents of which are incorporated herein by reference.

BACKGROUND

Technical Field

The present disclosure concerns an aerofoil for use in a gas turbine engine, a gas turbine engine component including the aerofoil, and a method of manufacturing a component for a gas turbine engine. In particular, but not exclusively, the aerofoil may be a vane and the turbine engine component a stator.

Description of the Related Art

Gas turbine engines include a number of rotating fan components, including the propulsive fan, compressor stages and turbine stages. The blades of the rotating fan components are formed by aerofoils. The gas turbine engine also includes a number of vanes. The vanes are provided before the rotating fan components, to direct the fluid (such as air) flowing through the engine and are also formed of aerofoils. The vanes, especially but not only those provided in the turbine stages, are required to withstand high temperatures, and so require cooling. Typically, cooled vanes included a narrow cooling passage adjacent at least an upstream surface of the vane.

In one example, the vane is formed by a cast spar. The cooling passage is formed by bonding a thin skin to the spar, with the channel formed between the skin and the spar. For high-temperature environments, the skin is typically machined from a cast single crystal sheet, and made from materials able to withstand high temperatures.

In another example, the vane is formed by a casting process, using a core to produce an internal passage in the vane. The casting process uses a mould defining a chamber in which the vane is formed. The core passes through the chamber, and thus also passes through the vane as it is formed. The core may be supported from its edges, during the casting process, which may leave artefacts or weak points in the cast part. The core may also be removed after the mould is disassembled.

SUMMARY

According to a first aspect there is provided an aerofoil for a gas turbine engine including: a body comprising a first body portion and a second body portion bonded to the first body portion, the first and second body portions having outer faces forming an outer surface of the aerofoil, and inner faces opposing the outer faces; a channel formed within the aerofoil by the inner faces of the first body portion and the second body portion; and a dividing sheet provided within the channel, such that a cooling passage is formed between the dividing sheet and the inner face of at least one of the first body portion and the second body portion, the cooling passage arranged to conduct cooling fluid adjacent the body, for cooling the body. The body may have a front face and an opposing rear face. The dividing sheet may extend parallel to at least a portion of a rear face of the body, such that the cooling passage is formed parallel to the rear face.

By using a separate sheet to form the cooling passage, and by making the body out of two separate parts, the aerofoil can be made without having to use cores in the casting process. This makes the aerofoil simple and easy to make, and also means that there is less variation in the thickness of the external wall between the cooling passage and the external surface, and in the width of the cooling passage, along the axial length and radial height of the aerofoil. The cooling passage and external wall can also be made thinner, improving cooling efficiency. Furthermore, the cooling passage being formed parallel to the rear face provides cooling at the face experiencing the highest temperatures.

Furthermore, because the dividing wall is provided in the channel, and does not form an external surface of the aerofoil, the dividing wall does not have to withstand as high temperatures as the body, and so the dividing wall is simpler and cheaper to make.

The body may be formed of a first material, and the dividing sheet may be formed of a second material, different to the first. The first material may have a first maximum operating temperature, and the second material may have a second maximum operation temperature, lower than the first.

Using different materials for the body and dividing wall, and using a material with a lower maximum operating temperature for the dividing wall, further helps to make the dividing wall simpler and cheaper to make, and allows the materials of the different parts to be selected to best meet the required properties.

The body may have a radial height, and the channel may extend along the radial height of the body.

The body may have a leading edge and a trailing edge, extending along the radial height of the body on opposing sides of the body. A slot may be formed in the trailing edge to allow escape of cooling fluid from the cooling passage. A first sidewall of the slot may be formed by the first body portion and a second sidewall of the slot may be formed by the second body portion.

Forming the trailing edge slot by bringing the body portions together, rather than coring or machining the slot, allows greater control over the size of the slot, providing less variation in the size of the slot along its radial height, and allows the slot to be made smaller. Also, the thickness of the sidewalls, and the position of the slot relative to the external surfaces, can be better controlled to improve aerodynamic efficiency The front face of the body and the rear face of the body may extend between the leading edge and the trailing edge. The front face and rear face may meet or come together at the leading edge and the trailing edge, and may be spaced apart in between the leading edge and trailing edge. The first body portion may form at least a portion of the rear face of the body. The second body portion may form at least a portion of the front face of the body.

The cooling passage may have a width between the inner surface of the body and dividing sheet, and wherein the width of the cooling passage is between 0.1 mm and 5 mm. For example, the width of the cooling passage may be between 0.5 mm and 2 mm. Reducing the width of the cooling passage provides improved cooling efficiency. The cooling passage may have constant or substantially constant width along its axial length and radial height. Alternatively, the width of the passage may vary along either or both of its axial length and radial height.

The aerofoil may include first struts extending from the inner face of the first body portion, into the channel; and second struts extending form the inner face of the second body portion, into the channel, and aligned with the first struts. The dividing sheet may be mounted between the first struts and the second struts. The struts provide support for the aerofoil, and also make the aerofoil easy to assemble, by helping to position the body portions and the dividing sheet.

The aerofoil may be a vane for a gas turbine engine.

According to a second aspect, there is provided a turbine engine component comprising: an annular platform; and a plurality of aerofoils according to the first aspect, extending outward from the platform.

The component may be a stator in the turbine engine. By using the aerofoils of the first aspect in the stator, the stator is simple to make, with less variation in the thickness of the external wall between the cooling passage and the external surface, and in the width of the cooling passage, along the axial length and radial height of the aerofoil. The cooling passage and external wall can also be made smaller, improving cooling efficiency.

Each aerofoil may be fixed to the annular platform by a bi-cast joint. The use of a bi-cast joint helps to hold the first and second body portions together. This can be particularly important if a bond between the portions fails.

The turbine engine component may include a second annular platform arranged concentrically with the annular platform, wherein the plurality of aerofoils may extend between the annular platform and the second annular platform, and each aerofoil may be fixed to the second annular platform by a bi-cast joint.

According to a third aspect, there is provided a turbine engine including one or more aerofoils according to either or both of the first aspect, and one or more components according to the second aspect.

According to a fourth aspect, there is provided a method of manufacturing a turbine component comprising: forming a first body portion and a separate second body portion, wherein the first and second body portions have outer faces and opposing inner faces and wherein, when the first and second body portions are joined, the first and second body portions form a body of an aerofoil, and the outer faces of the of the first and second body portions form the outer surface of the aerofoil and the inner faces define a channel; providing a dividing sheet between the first and second body portions, within the channel, such that a cooling passage is formed between the dividing sheet and the inner face of at least one of the first body portion and the second body portion, the cooling passage arranged to conduct cooling fluid adjacent the body, for cooling the body; and bonding the first and second body portions and the dividing sheet to form a aerofoil.

By using the method, and using a separate sheet to form the cooling passage, and making the body out of two separate parts, the aerofoil can be made without having to use cores in the casting process. This makes the aerofoil simple and easy to make, and also means that there is low variation in the thickness of the external wall between the cooling passage and the external surface, and in the size of the cooling passage. The cooling passage and external wall can also be made narrower, improving cooling efficiency.

Furthermore, because the dividing wall is provided in the channel, and does not form an external surface of the aerofoil, the dividing wall does not have to withstand as high temperatures as the body, and so the dividing wall is simpler and cheaper to make.

The first and second body portions may be formed by a casting process.

The first and second body portions may be cast without using a core, such that the first and second body portions include no cast channels or passages. Not using a core makes the casting process much simpler, and also means there is greater control over the size of the cooling passage, and less variation in the size of the cooling passage.

Bonding the first and second body portions and the dividing sheet may comprise brazing. Brazing is a simple technique that can be used to provide strong bonds between parts.

The method may include machining at least the inner faces of either or both of the first and second body portion. Machining at least the inner faces of either or both of the first and second body portion may comprise machining a region that forms the cooling passage. Machining at least the inner faces of either or both of the first and second body portion may comprise machining a region that forms a slot in a trailing edge of the body, the slot arranged to allow escape of cooling fluid from the cooling passage.

Machining the surfaces that form the cooling passage provides greater control over the size of the cooling passage, along its radial height and axial length. Machining the surfaces that form the cooling slots provides greater consistency in the slot size, and means the slot can be made smaller. Also, the thickness of the sidewalls, and the position of the slot relative to the external surfaces, can be better controlled to improve aerodynamic efficiency The method may include fixing one or more aerofoils to an annular platform using a bi-cast joint. The use of a bi-cast joint helps to hold the first and second body portions together. This can be particularly important if a bond between the portions fails.

The component may be a stator for a gas turbine engine.

The skilled person will appreciate that except where mutually exclusive, a feature described in relation to any one of the above aspects may be applied mutatis mutandis to any other aspect. Furthermore except where mutually exclusive any feature described herein may be either or both of applied to any aspect and combined with any other feature described herein.

DESCRIPTION OF THE DRAWINGS

Embodiments will now be described by way of example only, with reference to the Figures, in which.

DETAILED DESCRIPTION OF THE DISCLOSURE

Figure 1:
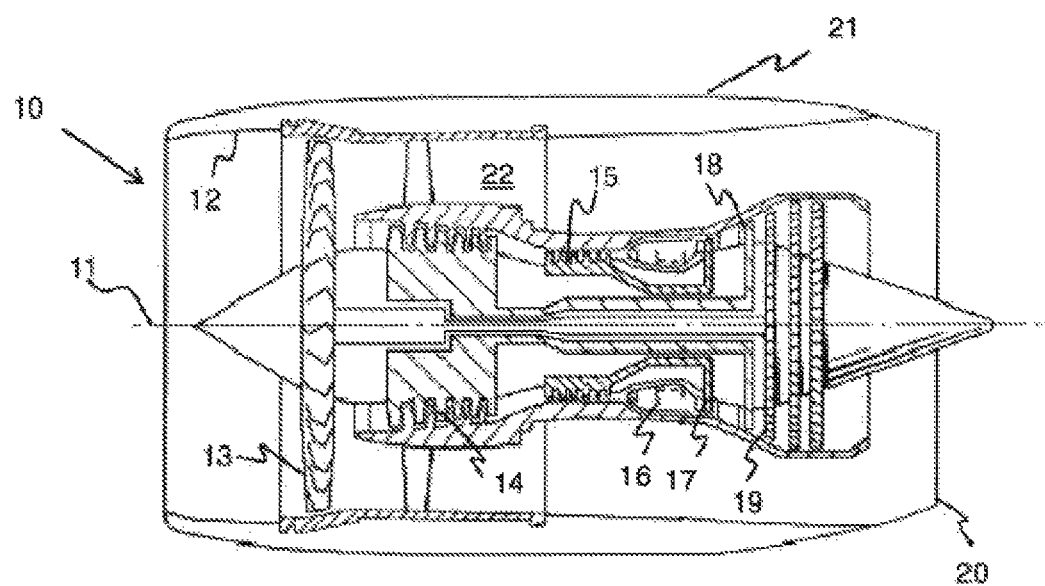
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have either or both of an alternative number of interconnecting shafts (e.g. two) and an alternative number of compressors or turbines. Further the engine may comprise a gearbox provided in the drive train from a turbine to a compressor and/or fan.

Figure 2:
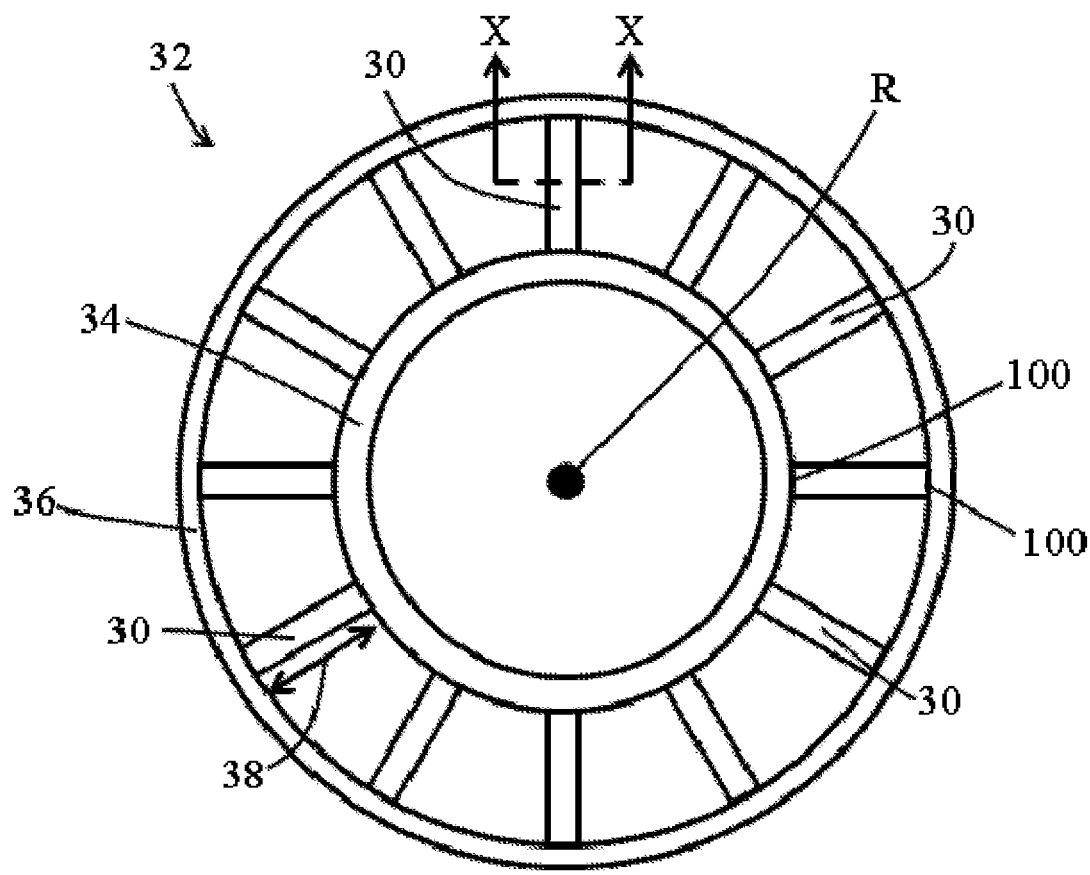
FIG. 2 is a front on view of a component of a gas turbine engine for mounting vanes.

The propulsive fan 13, compressor stages 14, 15 and the turbine stages 17, 18, 19 include rotating fan components, arranged around the rotational axis 11. To ensure efficient and even flow through the engine 10, a number of vanes 30 are also provided, between the rotating components 13, 14, 15, 17, 18, 19. FIG. 2 schematically illustrates a front view of a component 32 (also known as a stator) of a gas turbine engine 11 for supporting a number of vanes 30 in an annular space around the rotation axis 11.

The stator 32 includes an inner platform 34 and an outer platform 36 arranged around an axis of rotation R. This axis R may coincide with the rotation axis 11 of the gas turbine engine 10, or may be parallel but offset. The inner and outer platforms 34, 36 are annular in shape, and arranged concentrically. A number of vanes 30 extend between the inner platform 34 and the outer platform 36, in a radial direction with respect to the axis of rotation R. The radial height 38 of the vanes extends from the inner platform 34 to the outer platform 36. The platforms 34, 36 and vanes 30 have an axial length extending along the axis of rotation R, from an upstream end, towards a downstream end.

Figure 3A:
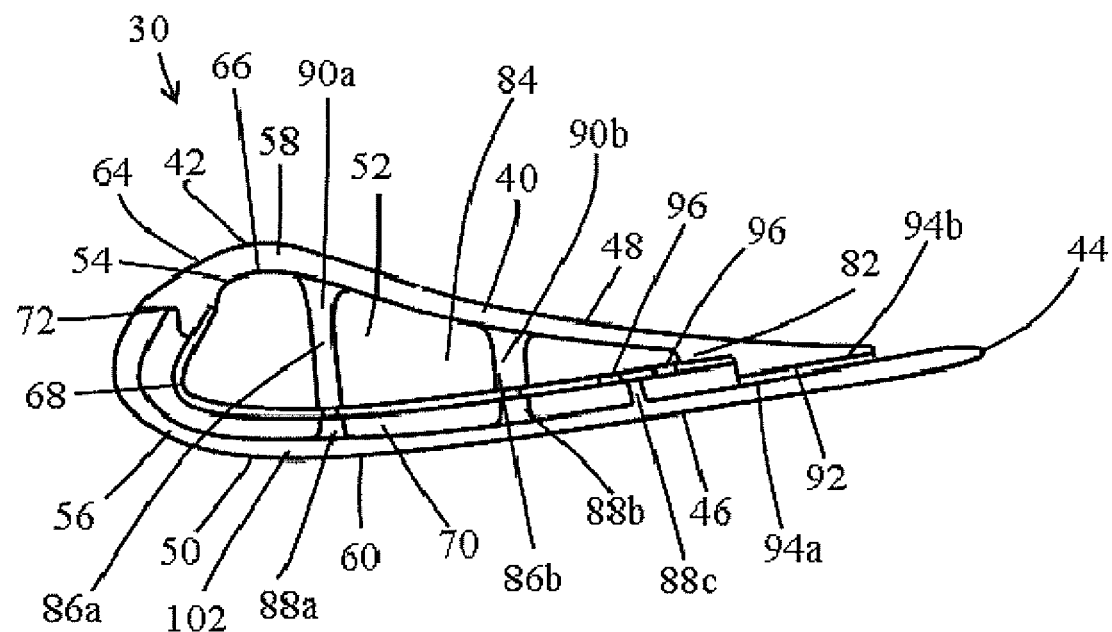
FIG. 3A is sectional view taken through a vane, through line X-X in FIG. 2.
Figure 3B:
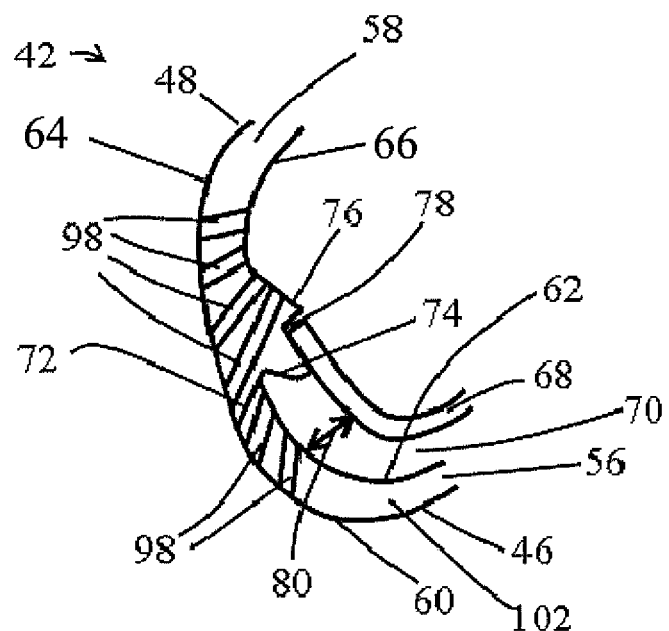
FIG. 3B shows the leading edge of the vane of FIG. 3A in more detail.

FIGS. 3A and 3B show a cross section through one of the vanes 30, taken through line X-X in FIG. 2. The cross section is taken along the axial length of the vane 30, and perpendicular to the radial height 38 of the vane 30.

Each vane 30 is made up of a body 40 having an aerofoil shape, in cross section. Accordingly, the body 40 has two axial faces 46, 48 extending between a leading edge 42 and a trailing edge 44, the two axial faces 46, 48 being connected by a curved surface in the region of the leading edge 42. Away from the leading edge 42 and trailing edge 44, the axial faces 46, 48 are spaced apart from each other. The leading edge 42 is arranged to face towards the up-stream end of the stator 32, in use. A first axial face 48 extends between the leading edge 42 and trailing edge 44 on the front of the body 40 and a second axial face 46 similarly extends between the leading edge 42 and trailing edge 44 on the rear of the body 40.

A suction surface and pressure surface are defined by the length of the surfaces along the rear face 46 and front face 48 from the leading edge 42 to the trailing edge 44. The suction surface is the surface with the longer length, and the pressure surface the surface with the shorter length.

A channel 52 is formed within the body 40, between the front and rear faces 48, 46. The channel 52 is defined by the inner surface 54 of the body 40. The channel 52 will be described in more detail below.

The body 40 is constructed of two separate separately portions 56, 58. In the example shown, a first portion 56 forms the trailing edge 44, and the majority of the rear face 46. The second portion 58 forms the remainder of the rear face 46, the leading edge 42, and the front face 48 to the trailing edge 44.

The first portion 56 has an outer face 60 and an inner face 62. Similarly, the second portion 58 also has an outer face 64 and an inner face 66. The outer faces 60, 64 of the body portions 56, 58 form an outer surface 50 of the vane 30, which is the surface that air (or other fluids) passing through the gas turbine engine 10 encounter. The inner faces 62, 66 of the body portions 56, 58 form the inner face of the vane 54, defining the channel 52.

The channel 52 extends along the radial height 38 of the vane 30, from the inner platform 34 to the outer platform 36, and also along the axial length of the vane 30, from the leading edge 42 to the trailing edge 44. A dividing sheet 68 is provided within the channel 52, extending along the axial length of the channel 52 (from an end near the leading edge 42 to an end near the trailing edge 44) and the radial height of the channel 52 (from the inner platform 34 to the outer platform 36). The dividing sheet 68 extends parallel to the rear face 46 of the body 40. The dividing sheet 68 thus splits the channel 52 into two parts, such that a cooling passage 70 is formed between the inner surface 54 of the first portion 56 of the body 40 and the dividing sheet 68. Between the dividing sheet 68 and the front face 48 of the body 40, the channel 52 forms a conduit 84. The conduit 84 is formed by the majority of the width of the channel 52.

FIG. 3B illustrates the joint near the leading edge 42 in more detail, showing the join 72 between the first and second body portions 56, 58, and the dividing sheet 68. At the join 72, the first body portion 56 is thinner than the second body portion 58. A projection 76 is formed extending form the inner face 66 of the second body portion 58, to form a step 78 at the end 74 of the second boy portion 58 near the leading edge 42. This step 78 acts as a seat for locating the dividing sheet 68. The cooling passage 70 and rear face 46 are of constant thickness 80 along their axial length and radial height, and so, because of the step 78, the combined thickness of the rear face 46 and the channel 52 is the same as the thickness of the second body portion 58 at the leading edge 42. Therefore, the cooling passage 70 is a narrow cooling passage formed adjacent the rear face 46.

At end of the channel 52 near the trailing edge 44, a similar step 82 is formed in the inner face 62 of the second body portion 58. The second step 82 is also for locating the dividing sheet 68, and locates the sheet 68 such that the constant thickness 80 of the cooling passage 70 is maintained.

A number of supporting struts 86 are formed extending across the channel 52. Rear struts 88 extend from the inner face 62 of the first body portion 56 to the dividing sheet 68. Similarly, front struts 90 extend from the inner face 66 of the second body portion 58 to the dividing sheet 68. Therefore, the dividing sheet 68 may be mounted on the struts 90, 88, in addition to the seats 78, 82 at the leading edge 42 and trailing edge 44. The length of the front and rear struts 90, 88 is such that the struts maintain the constant width 80 of the cooling passage 70.

As shown in FIG. 3A, a first rear strut 88a, towards the end of the channel 52 near the leading edge 42 aligns with a first front strut 90a across the dividing sheet 68, to form a single strut 86a broken by the dividing sheet 68. Similarly, a second rear strut 88b aligns with a second front strut 90b across the dividing sheet 68. A third rear strut 88c is provided, towards the end of the channel 52 near the trailing edge 44, but no equivalent front strut is formed.

The struts 86 may extend along the radial height of the channel 52, or a portion of the radial height of the channel 52 from the inner platform 34 to the outer platform 36, such that they form ribs. Alternatively the struts 86 may be formed as columnar projections, positioned at various points along the radial height of the channel 52.

Towards the trailing edge 44 of the body 30, the rear face 46 and front face 48 close together. At the trailing edge 44, the rear face 46 is spaced from the front face 48 such that a slot 92 is formed, opening into the cooling passage 70. A first sidewall 94a of the slot 92 is formed by a region of the inner face 62 of the first body portion 56, and a second sidewall 94b of the slot 92 is formed by a region of the inner face 66 of the second body portion 58.

The slot 92 may extend the full radial height of the body 40, or a portion of the radial height. The slot 92 may include spacers or supports (not shown) extending between the front face 48 and rear face 46, positioned along its radial height, forming partial closures, so that there are a series of slots separated by partial closures. Alternatively, the slot 92 may be fully open along its radial height. Shaped passages may be used instead of slots.

As will be discussed in more detail below, the body portions 56, 58 are formed separately by a casting process. The body portions 56, 58 are then joined by brazing, or any other suitable technique.

Figure 4:
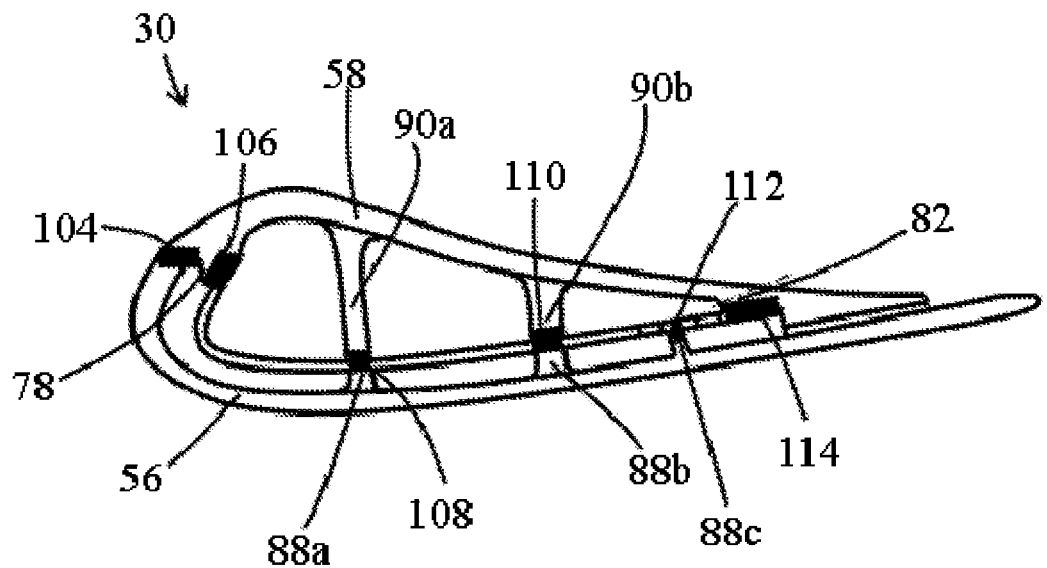
FIG. 4 shows the sectional view of FIG. 3A, illustrating the bonding points in the vane.

The bonding of the first body portion 56 to the second body portion 58 is shown by FIG. 4 in more detail. FIG. 4 shows a number of brazing surfaces 104, 106, 108, 110, 112, 114 (highlighted by the thicker lines) where the body portions 56, 58 are bonded together. A first brazing surface 104 is formed near the leading edge 42, at the join 72 between the body portions 56, 58. A second brazing surface 106 is provided between the step 78 in the inner face 66 of the second body portion 58 near the leading edge 44, and the dividing sheet 68. Third 108, fourth 110 and fifth 112 brazing surfaces are provided between the struts 86 and the dividing sheet 68. At each of these surfaces 108, 110, 112, the dividing sheet may be either or both of bonded to the rear struts 88 and the front struts 90. A sixth brazing surface 114 is provided between the dividing sheet 68 and the step 82 formed at the trailing end of the inner face 66 of the second body portion 58. Further brazing surfaces (not shown) may be provided if the slot 92 includes any spacers or supports between the sidewalls 94a,b of the slot 92.

Each vane 30 is fixed to the platforms 34, 36 using bi-cast joint 100. As well as securing the vanes 30 to the platforms 34, 36, the bi-cast joints further act to hold the body portions 56, 58 together, and can help maintain the structural integrity of the vane 30, even in the event of failure of one or more of the brazing joints 104, 106, 108, 110, 112, 114.

In use, the channel 52 can be used to provide a cooling fluid, such as air, to the vane 30. The cooling fluid is provided into the conduit 84 from either or both of the inner platform 34 and the outer platform 36, and travels along the radial height of the conduit 84, to the other platform 34, 36. Air passes from the conduit 84, into the cooling passage 70, through openings 96 formed in the dividing sheet 68. The cooling fluid can then pass through the cooling passage 70 in either or both of an axial and radial direction (with respect to the axis of rotation R). The cooling fluid can escape the cooling passage 70 through openings 98 provided near the leading edge 42 (only shown in FIG. 3B), and through the slot 92 at the trailing edge 44.

The body portions 56, 58 of the vane 30 are formed of material that has a high maximum operating temperature, so that it is resistant to high temperature oxidation and fatigue and melting, and the outer surface 50 of the vane 30 is able to withstand the harsh environments the vane 30 may experience in, for example, a turbine stage 17, 18, 19 of a turbine engine 10. Examples of materials that may be used for the body portions 56, 58 include metals, metal alloys, ceramics and ceramic composites. In one example, the body portions 56, 58 may be high temperature nickel superalloys, including directionally solidified and single-crystal alloys Since the dividing sheet 68 is within the channel 52 of the vane 30, it is not exposed to the same conditions as the outer surface 50 of the vane 30. Therefore, the material used for the dividing sheet 68 has a lower maximum operating temperature, and so less expensive materials can be chosen. Furthermore, the material of the dividing sheet 68 can be chosen such that machining may not be required (or minimal) to prepare the sheet 68, and the sheet is more pliable, and easier to fit into place. Examples of materials used for the dividing sheet 68 include Nickel based or cobalt based alloys such as C263®, Nimonic 75®, Inco718®, Haynes 25®, Haynes 282®, Hastelloy X®, Inco625®.

Figure 5:
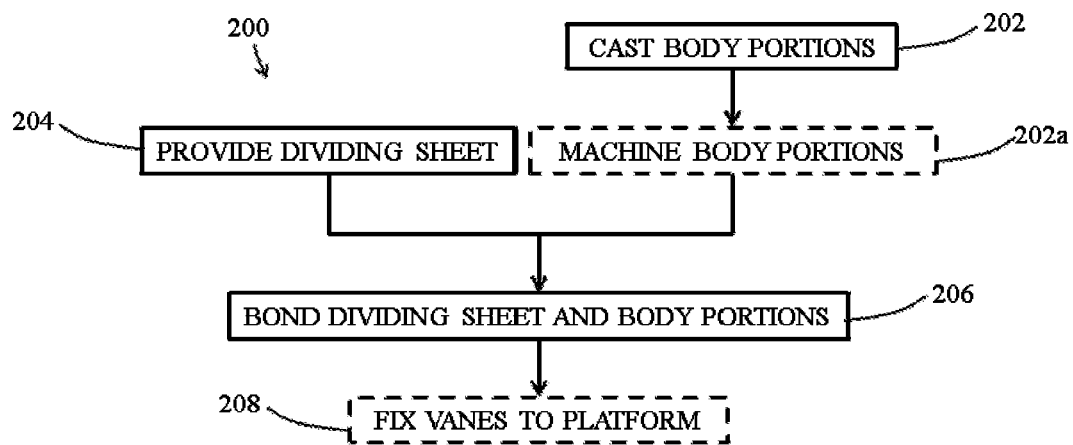
FIG. 5 schematically illustrates a method of manufacturing the component of FIG. 2.
Figure 6:
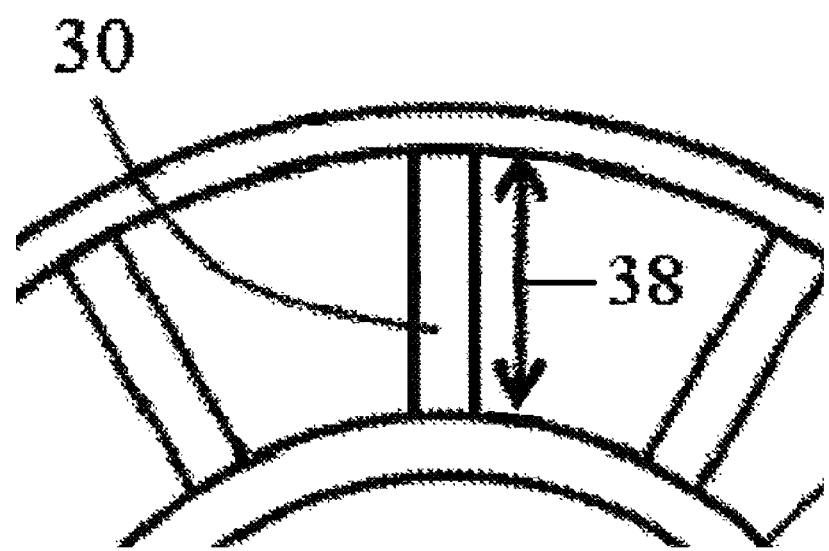
FIG. 6 shows a front view of a vane of FIG. 2.

FIG. 5 illustrates an example embodiment of a method 200 for forming a vane 30 described in relation to FIGS. 3A, 3B and 4.

At a first step 202, the first and second body portions 56, 58 are formed by a casting process. Neither of the body portions 56, 58 include internal passageways, and so no core is required in the casting mould. Therefore, a simple casting mould, that defines a chamber of the size and shape required, can be used.

At a second step 204, the dividing sheet 68 is provided. This may be by casting, extrusion, additive manufacturing, or any other suitable technique. Machining may be used to finish the dividing sheet 68, but this is not always necessary.

At a third step 206, the body portions 56, 58 and dividing sheet 68 are bonded together to form the vane 30.

In some embodiments, the method 200 may include the optional step 202a of machining the surfaces of the body portions 56, 58.

The machining step 202a may include machining the outer surfaces 60, 64 of the body portions to provide the desired finish.

In addition or instead, the machining step 202a may include machining the inner face 62 of the first body portion 56. This may include machining the inner face 62 in a region that forms the cooling passageway 70. By doing this, the width 80 of both the passageway 70 and the wall 102 separating the passage 70 from the outer surface 50 of the vane 30 can be controlled. Therefore the wall 102 and passage 70 can be made narrow, with little variation along their axial length and radial height.

Machining the inner face 62 of the first body portion 56 may also include machining the inner face 62 of the first body portion 56 in a region forming the trailing edge slot 92.

The inner face 66 of the second body portion 58 may also be machined, in the region of either or both of the conduit 84 and the region of the slot 92. Where the inner faces 62, 66 of the body portions 56, 58 are machined in the region of the slot 92, this can provide a narrow slot with consistent width along its radial height.

The method 200 may also include a final optional step 208 of fixing the vane 30 to inner and outer platforms 34, 36 to form a stator 32, with a bi-cast joint 100.

In the examples discussed above, the vane 30 is split on the rear face 46, near the leading edge 42. It will be appreciated that this is by way of example only. The body of the vane 30 may be divided in any way that allows an opening into the channel 52, so that the dividing sheet 68 can be fitted into the channel 52. In some example, the body may be formed of more than two portions 56, 58.

Furthermore, the body portions 56, 58 may be bonded together at any contact points between the parts. Also, brazing is just one example of a bonding technique that can be used to join the parts. Any other suitable technique may be used.

Similarly, any suitable technique may be used to join the vane 30 to the platforms 34, 36, instead of bi-cast joints. For example, the vane 30 may be fixed to the platforms 34 using welding or brazing.

The structure of the vane 30 discussed above is given by way of example only. It will be appreciated that the vane 30 may have any suitable shape, depending on the desired use of the vane 30.

Furthermore, the shape and structure of the channel 52 is given by way of example only, and any suitable channel 52 may be used. For example, the channel 52 may not extend the full radial height of the vane 30, or the full length from the leading edge 42 to the trailing edge 44, of the full width from the front face 48 to the rear face 46. Furthermore, the positioning of the dividing sheet 68 is by way of example only, and the cooling passage 70 and conduit 84 may have any suitable shape and size. In some examples, there may be two or more cooling passages 70. The cooling passages may be provided at different heights along the aerofoil 30, or on different faces 46, 48. The cooling passages 70 may be separated by projections (not shown) extending from the inner faces 62, 66 of the first and second body portions 56, 58, or projections extending from the dividing sheet 68. These projections may increase cooling effectiveness, and provide further support for the dividing sheet 68.

In the examples discussed above, the struts 86 extend from the first and second body portions 56, 58. In other examples, the struts 86 (and other features of the channel 52) may be formed a part of the dividing sheet 68, and brazed (or otherwise joined) to the body portions 56, 58.

In the examples discussed above, a single dividing sheet 68 is provided. However, in other examples, there may be two or more separate dividing walls used to form the channel(s).

The struts 86 discussed above are given by way of example only, and any number or arrangement of struts 86 may be used. In some examples, the struts 86 may be omitted.

The path of cooling fluid discussed above is given by way of example only, and the cooling may follow any suitable path. The channel 52 may be arranged to cause the passage of the cooling fluid along a particular desired path. For example, the struts 86 may be used to help direct the cooling fluid along particular paths.

In the examples discussed above, the slot 92 at the trailing edge 44 is formed by bringing the body portions 56, 58 together. In other examples, the slot 92 may be formed in one of the body portions 56, 58. This may be by either or both of using a core in the casting process, and by machining after casting. Where the slot 92 is formed in this way, a further contact point may be provided between the body portions 56, 58, near the trailing edge 44. This can be used for brazing.

In the above examples, the width of the cooling passage 70 is constant along is axial length and radial height. The width of the passage 70 may be varied in one or both of these directions. For example, the passage 70 may be wider at any apertures 92, 96, 98 where the cooling fluid enters or exits the passage 70, and narrower between these apertures 92, 96, 98, in order to increase cooling efficiency. The use of the dividing sheet 68 within the channel 52 provides greater control over this width, as the spacing between the dividing sheet 68 and the rear face 46 may be varied, or either or both of the width of the dividing sheet 68, and the rear face 46 may be easily varied by machining, the casting process and the like.

Similarly, in the above examples the width of the slot is constant along the radial height of the vane 30, but this may also be varied.

The stator 32 described above is given by way of example. Any suitable stator 32 may be used. In some embodiments, the stator 32 may only include a single annular platform 34, 36.

The method 200 discussed above is also given by way of example only. Any suitable method for manufacturing the vane 30 may be used. For example, the body portions 56, 58 may be formed of processes other than casting.

The above embodiments are related to a vane 30 for use in a stator 32 in a turbine engine 10. However, it will be appreciated that this is just one example of an aerofoil, and the teaching of the disclosure may be applied to any aerofoil, in a turbine engine or not.

It will be understood that the disclosure is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

I claim:

1. An aerofoil for use in a gas turbine engine including:
a body comprising a first body portion and a second body portion bonded to the first body portion, the first and second body portions having outer faces forming an outer surface of the aerofoil, and inner faces opposing the outer faces;
a channel formed within the aerofoil by the inner faces of the first body portion and the second body portion;
a dividing sheet provided within the channel, such that a cooling passage is formed between the dividing sheet and the inner face of at least one of the first body portion and the second body portion, the cooling passage arranged to conduct cooling fluid adjacent the body, for cooling the body;
a plurality of rear struts extending from the inner face of the first body portion to the dividing sheet; and
a plurality of front struts extending from the inner face of the second body portion to the dividing sheet,
wherein the body has a rear face and an opposing front face; and wherein the dividing sheet extends parallel to at least a portion of a rear face of the body, such that the cooling passage is formed parallel to the rear face, and wherein the plurality of rear struts and the plurality of front struts are sized such that at least a first portion of the cooling passage has a constant width along an axial extent and a radial height of the first portion of the cooling passage, the first portion of the cooling passage defined between a front strut of the plurality of front struts located closest to a leading edge of the aerofoil relative to the other front struts of the plurality of front struts and a rear strut of the plurality of rear struts located closest to a trailing edge of the aerofoil relative to the other rear struts of the plurality of rear struts, the radial height defined as a radial extent of the aerofoil between a root of the aerofoil and a tip of the aerofoil.

2. The aerofoil as claimed in claim 1, wherein the body is formed of a first material, and the dividing sheet is formed of a second material, different to the first.

3. The aerofoil as claimed in claim 2, wherein the first material has a first maximum operating temperature, and the second material has a second maximum operating temperature, lower than the first.

4. The aerofoil as claimed in claim 1, wherein the body has a leading edge and a trailing edge, extending along a radial height of the body on opposing sides of the body; wherein a slot is formed in the trailing edge to allow escape of cooling fluid from the cooling passage, and wherein a first sidewall of the slot is formed by the first body portion and a second sidewall of the slot is formed by the second body portion.

5. The aerofoil as claimed in claim 1, wherein the cooling passage has a width between the inner surface of the body and the dividing sheet, and wherein the width of the cooling passage is between 0.5 mm and 2 mm.

6. The aerofoil as claimed in claim 1, wherein the plurality of front struts are aligned with the plurality of rear struts.

7. A turbine engine component comprising:
a first annular platform; and
a plurality of aerofoils according to claim 1, extending outward from the platform.

8. The turbine engine component as claimed in claim 7, wherein each aerofoil is fixed to the first annular platform by a bi-cast joint.

9. The turbine engine component as claimed in claim 7, including
a second annular platform arranged concentrically with the annular platform,
wherein the plurality of aerofoils extend between the first annular platform and the second annular platform, and each aerofoil is fixed to the second annular platform by a bi-cast joint.

10. A method of manufacturing a turbine component comprising:
forming a first body portion and a separate second body portion, wherein the first and second body portions have outer faces and opposing inner faces and wherein, when the first and second body portions are joined, the first and second body portions form a body of an aerofoil, and the outer faces of the first and second body portions form the outer surface of the aerofoil and the inner faces define a channel;
providing a dividing sheet between the first and second body portions, within the channel, such that a cooling passage is formed between the dividing sheet and the inner face of at least one of the first body portion and the second body portion, the cooling passage arranged to conduct cooling fluid adjacent the body, for cooling the body;
providing a plurality of rear struts extending from the inner face of the first body portion to the dividing sheet and a plurality of front struts extending from the inner face of the second body portion to the dividing sheet, the plurality of rear struts and the plurality of front struts being sized such that at least a first portion of the cooling passage has a constant width along an axial extent and a radial height of the first portion of the cooling passage, the first portion of the cooling passage defined between a front strut of the plurality of front struts located closest to a leading edge of the aerofoil relative to the other front struts of the plurality of front struts and a rear strut of the plurality of rear struts located closest to a trailing edge of the aerofoil relative to the other rear struts of the plurality of rear struts, the radial height defined as a radial extent of the aerofoil between a root of the aerofoil and a tip of the aerofoil; and
bonding the first and second body portions and the dividing sheet to form an aerofoil.

11. The method as claimed in claim 10, wherein the first and second body portions are formed by a casting process.

12. The method as claimed in claim 11, wherein the first and second body portions are cast without using a core, such that the first and second body portions include no cast channels or passages.

13. The method as claimed in claim 10, wherein bonding the first and second body portions and the dividing sheet comprises brazing.

14. The method as claimed in claim 10, including machining at least the inner faces of either or both of the first and second body portion.

15. The method as claimed in claim 14, wherein machining at least the inner faces of either or both of the first and second body portion comprises machining a region that forms the cooling passage.

16. The method as claimed in claim 14, wherein machining at least the inner faces of either or both of the first and second body portion comprises machining a region that forms a slot in a trailing edge of the body, the slot arranged to allow escape of cooling fluid from the cooling passage.

17. The method as claimed in claim 10, including:
fixing one or more aerofoils to an annular platform using a bi-cast joint.

* * * * *